J. Y. ATMAR.
SEED PLANTER.
APPLICATION FILED JULY 26, 1911.

1,021,652.

Patented Mar. 26, 1912.
2 SHEETS—SHEET 1.

Witnesses
Geo. Ackman Jr.
Wm. Ragger

Inventor
J. Y. Atmar
By Victor J. Evans
Attorney

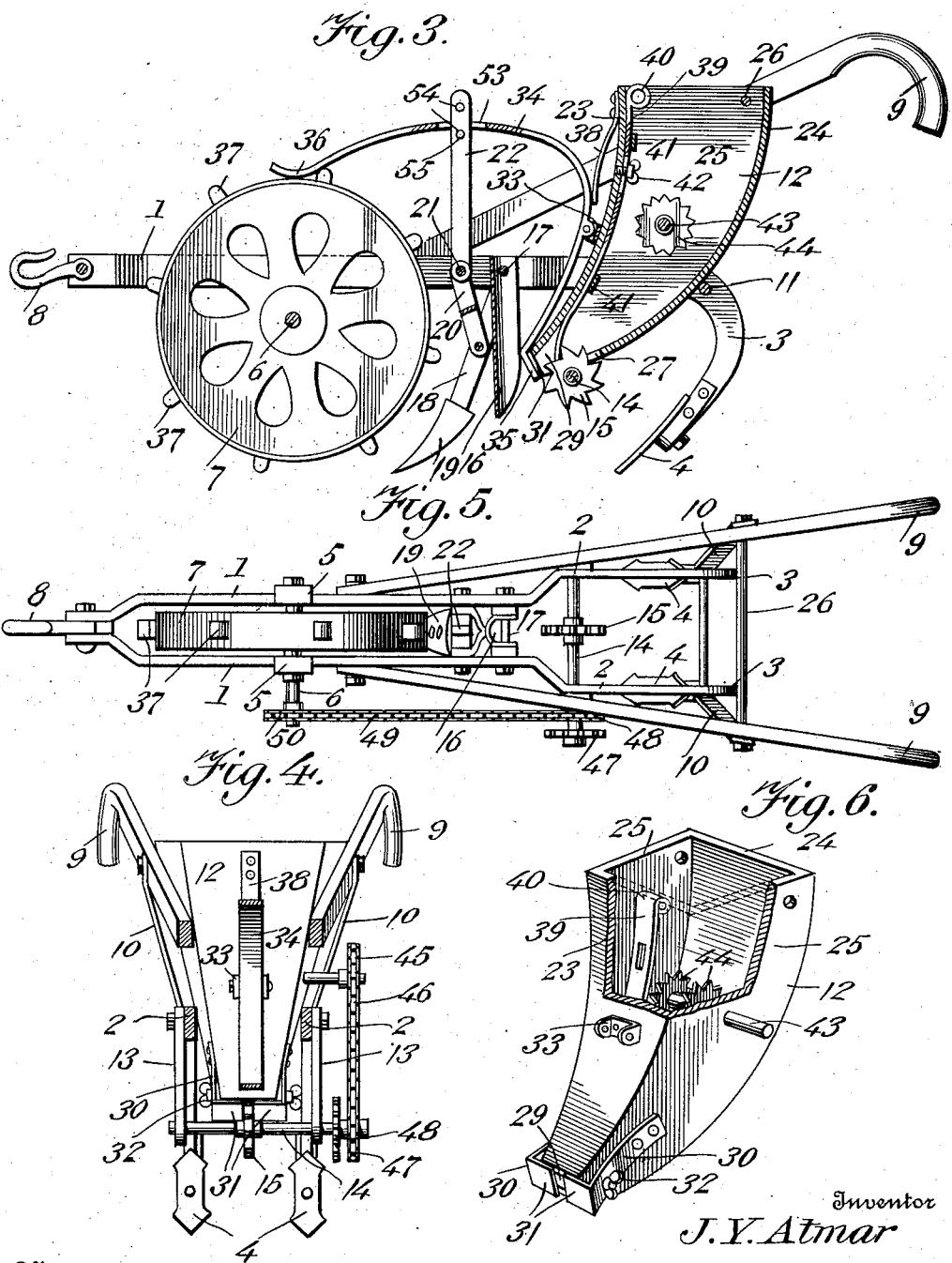

UNITED STATES PATENT OFFICE.

JOSEPH Y. ATMAR, OF TEAGUE, TEXAS.

SEED-PLANTER.

1,021,652.

Specification of Letters Patent.   Patented Mar. 26, 1912.

Application filed July 26, 1911. Serial No. 640,546.

*To all whom it may concern:*

Be it known that I, JOSEPH Y. ATMAR, a citizen of the United States, residing at Teague, in the county of Freestone and State of Texas, have invented new and useful Improvements in Seed-Planters, of which the following is a specification.

This invention relates to seed planters, and it has for its object to produce a simple and efficient device which may be used for planting various seeds such as cotton, rice, sorghum or the like.

A further object of the invention is to produce a simple and efficient device of this class in which the quantity of seed discharged may be conveniently regulated.

A still further object of the invention is to produce a simple and efficient device of the class described which may be used for sowing the seed in drills or in hills, as may be desired, by the simple adjustment of one part of the mechanism.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
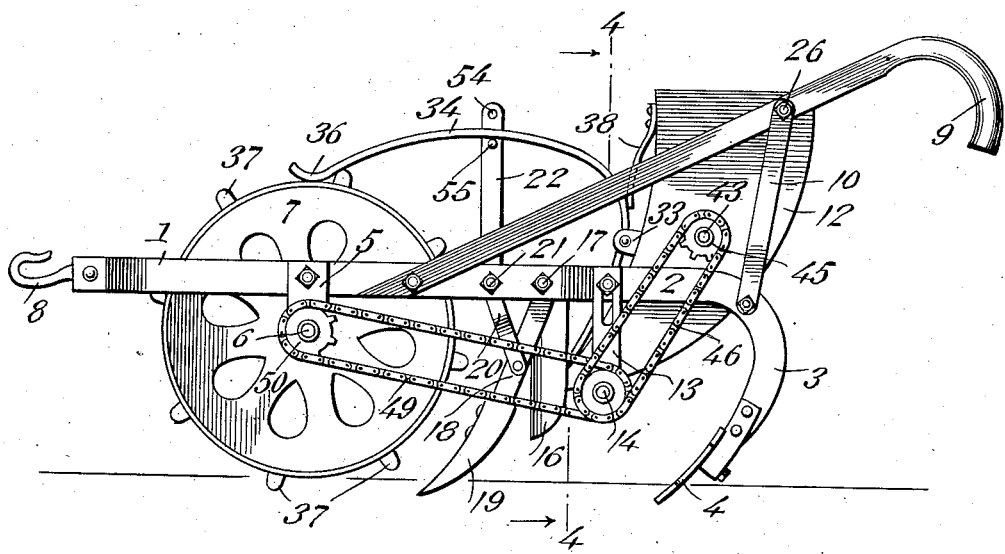
Figure 2:
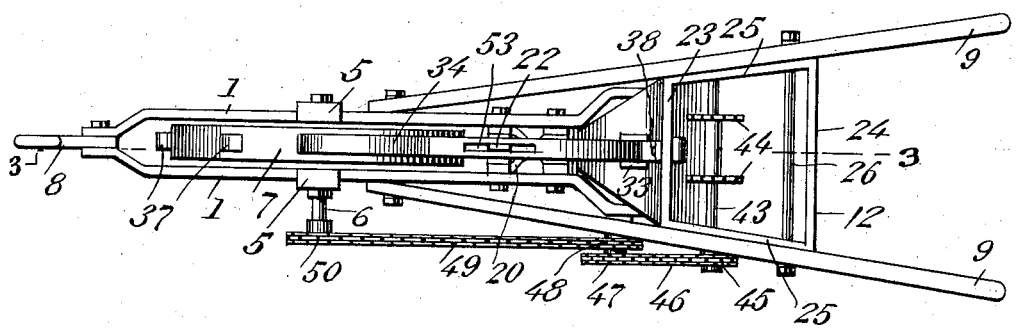

In the drawings, Figure 1 is a side elevation of a seed planter constructed in accordance with the invention. Fig. 2 is a top plan view of the same. Fig. 3 is a longitudinal vertical sectional view taken on the plane indicated by the line 3—3 in Fig. 2. Fig. 4 is a vertical transverse sectional view taken on the line 4—4 in Fig. 1. Fig. 5 is a top plan view of the frame, the hopper having been removed. Fig. 6 is a perspective detail view showing the hopper detached from the frame with parts broken away.

Corresponding parts in the several figures are denoted by like characters of reference.

The frame of the improved planter is composed of side bars or beams 1, 1 which are suitably connected and spaced apart and which are provided intermediate their front and rear ends with offsets 2, the rear ends being bent downwardly to form shanks 3 upon which the covering blades 4 are mounted. The side bars or beams 1, 1 are equipped with bearings 5 for a shaft or axle 6 carrying a ground engaging wheel 7. The forward end of the frame structure is equipped with a hook 8 for the attachment of the draft. Handles 9 are also provided, the forward ends of said handles being directly connected with the beams or side members 1, while the rear ends of the handles are connected with the upper ends of braces 10, the lower ends of which are securely connected with the beams or side members 1 near the rear ends of the latter by means of a transverse bolt or fastening member 11, which latter also serves to support the hopper 12.

The outwardly offset rear ends of the beams or side members 1 are provided with downwardly extending arms or brackets 13 affording bearings for a shaft 14 upon which a seed feeding disk 15 is mounted, said seed feeding disk being provided with ratchet teeth, as shown. Supported between the beams or side members 1 directly in front of the offsets 2 is a seed chute 16, said chute being supported upon a transverse bolt 17 which also supports a standard 18 carrying a furrow opener 19. The standard 18 is connected by a brace member 20 with a transverse bolt 21 upon which an upwardly extending arm 22 is pivotally mounted.

The hopper 12 is provided with curved front and rear walls 23, 24, the outer face of the front wall being concave and the outer face of the rear wall being convex, and said walls being eccentrically disposed with reference to one another, and said front and rear walls being suitably connected with the side walls 25 to form a downwardly tapering box, the lower end of which projects forwardly, as shown. The box or hopper 12 is supported between the outwardly offset rear ends of the beams or side bars 1, said hopper being partly supported upon the cross piece or bolt 11, and said hopper being also secured by means of the bolt or fastening member 26 which connects the upper ends of the braces 10 with the handles 9, said bolt or fastening member extending transversely through the hopper, as shown. The lower end of the rear wall of the hopper is provided with a slot 27 in which the ratchet toothed seed disk 15 operates. The lower pointed extremity or nose 28 of the hopper also has a seed opening 29. For the purpose of regulating the passage of seed through said opening closures are provided which consist of springs 30 secured upon the side walls of the hopper and provided at their lower ends with laterally extending lugs 31 which may be projected in advance of the opening 29 by means of set screws 32 engaging the side walls of the hopper and operating through apertures in the springs 30. It is obvious that the resiliency or tension of said springs will normally be exerted to move the lugs 31 outwardly from the opening 29, and that the latter may be partly obstructed by tightening the screws 32 to force the lugs 31 into position adjacent to the opening 29 which latter may thus be partly obstructed.

Pivotally mounted upon a lug 33 on the front wall of the hopper is a lever 34, the downwardly extending arm of which has a flange 35 constituting a closure which is adapted to lie closely adjacent to the seed opening 29, which latter may thereby be completely obstructed. The upwardly extending arm of the lever 34 is curved in a forward direction and terminates in a shoe 36 which rides upon the edge of the ground engaging wheel 7. The latter is provided at suitable intervals with radially extending tappets 37 adapted, by engagement with the shoe 36, to tilt or trip the lever 34, thereby moving the flange or closure 35 to a non-obstructing position. The forwardly extending arm of the lever 34 has a slot 53 for the passage of the pivoted arm 22, which latter is provided with a plurality of perforations 54 for the passage of a transverse pin or supporting member 55, whereby the lever may be supported in position to be engaged by the tappets 37 or in a position where it will be held out of engagement with said tappets, thus sustaining the flange or closure 35 in a non-obstructing position with reference to the seed aperture of the hopper. The lever, when not actuated by one of the tappets 37, is restored to initial or normal position by gravity which may be assisted by means of a suitably arranged spring 38.

Suitably mounted upon the rear face of the front wall 23 of the hopper is a slide 39 preferably constructed of resilient material and having at its upper end a handle 40, whereby it may be manipulated. A keeper 41 is provided to guide said slide, and the latter may be secured in adjusted position by means of a set screw 42. The lower end of the slide 39 which is suitably curved is adapted to form a cut-off which by resiliently engaging the ratchet teeth of the seed feeding disk will regulate the discharge of seed.

Extending transversely through the seed box is a shaft 43 carrying one or more stirring or agitating disks 44. The shaft 43 carries at one end a sprocket wheel 45 which is connected by a chain 46 with a sprocket wheel 47 upon the shaft 14. The latter has an additional sprocket wheel 48 which is connected by a chain 49 with a sprocket wheel 50 upon the shaft or axle 6 of the ground-engaging wheel 7 from which motion will thus be transmitted to the shafts carrying the seed feeding disk and the agitating disks.

From the foregoing description, taken in connection with the drawings hereto annexed, the operation and advantages of this invention will be readily understood by those skilled in the art to which it appertains. It will be seen that by simply detaching the lever 34, the device may be utilized for planting seed in drills. By replacing the lever 34, the seed will be planted in hills, the distance between which will be governed by the distance between the tappets 37 upon the ground engaging wheel 7. Simple and efficient means are provided whereby the size of the discharge opening of the seed box may be regulated to suit various kinds of seed and also to regulate the quantity that is to be dropped. The ratchet toothed seed disk 15 will efficiently discharge the seed from the hopper through the opening 29, the seed being guided downwardly by means of the spout or chute 16 and deposited into the furrow formed by the opener 19, the seed being subsequently covered by the covering blades 4, 4 provided for the purpose.

Having thus described the invention, what is claimed as new is:—

1. In a seed planter, a frame comprising side beams, a suitably supported curved hopper having its lower end projected forwardly between the side beams, said hopper being provided with a slot in the underside thereof and with a seed aperture at the nose thereof, a toothed seed disk operating in the slot, means for regulating the size of the seed aperture, and means for intermittently obstructing the seed aperture.

2. In a seed planter, a frame comprising side beams, a ground engaging wheel supported in bearings upon the side beams, a curved hopper supported between the side beams and having a forwardly extending lower portion provided with a seed aperture and with a slot in the underside thereof, a shaft supported in bearings upon the frame and having a toothed disk operating in the slot of the hopper, means for regulating the size of the seed aperture, a lever pivoted upon the front side of the hopper and having a downwardly extending arm provided with a flange constituting a closure for the seed aperture, said lever being provided with a forwardly extending arm having a terminal shoe, and tappets upon the ground engaging wheel adapted to engage said shoe to actuate the lever.

3. In a seed planter, a frame comprising side beams, a ground engaging wheel, a hopper supported between the side beams and having a forwardly extending nose provided with a seed aperture, a lever fulcrumed upon the hopper and having an arm provided with a flange constituting a closure for the seed aperture, seed discharge means associated with the hopper, a cross bar connecting the side members of the frame and having a pivoted upwardly extending arm upon which the lever is guided, tappets upon the ground engaging wheel adapted to engage and to actuate the lever, and means for adjustably supporting the lever with reference to the pivoted arm.

In testimony whereof I affix my signature in presence of two witnesses.

JOSEPH Y. ATMAR.

Witnesses:
J. M. CONNELL,
S. R. CONNELL.

Copies of this patent may be obtained for five cents each, by addressing the "Commissioner of Patents, Washington, D. C."